(12) United States Patent
Allen et al.

(10) Patent No.: US 11,144,437 B2
(45) Date of Patent: Oct. 12, 2021

(54) PRE-POPULATING CONTINUOUS DELIVERY TEST CASES

(71) Applicant: INTERNATIONAL BUSINESS MACHINES CORPORATION, Armonk, NY (US)

(72) Inventors: Corville O. Allen, Morrisville, NC (US); Monica A. Murray, Atlanta, GA (US); Mario A. Maldari, Boulder, CO (US); Paul A. Smith, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/693,466

(22) Filed: Nov. 25, 2019

(65) Prior Publication Data

US 2021/0157716 A1    May 27, 2021

(51) Int. Cl.
*G06F 9/44*     (2018.01)
*G06F 9/445*    (2018.01)
*G06F 11/36*    (2006.01)
*G06F 8/41*     (2018.01)
*G06F 40/40*    (2020.01)

(52) U.S. Cl.
CPC ............ *G06F 11/3688* (2013.01); *G06F 8/42* (2013.01); *G06F 11/3684* (2013.01); *G06F 40/40* (2020.01)

(58) Field of Classification Search
CPC .... G06F 11/3684; G06F 11/3688; G06F 8/42; G06F 40/40
See application file for complete search history.

(56) References Cited

U.S. PATENT DOCUMENTS

| | | | |
|---|---|---|---|
| 7,437,614 B2 | 10/2008 | Haswell | |
| 9,047,414 B1 | 6/2015 | Matyjek | |
| 9,582,408 B1 | 2/2017 | Jayaraman | |
| 2011/0047529 A1 | 2/2011 | Randimbivololona | |
| 2011/0113287 A1* | 5/2011 | Gururaj | G06F 11/3684 714/37 |
| 2013/0097586 A1 | 4/2013 | Chandra | |
| 2014/0059391 A1* | 2/2014 | Chan | G06F 11/2268 714/45 |
| 2014/0281721 A1 | 9/2014 | Navalur | |

(Continued)

OTHER PUBLICATIONS

Geant, Deliverable D8.1 Service Validation and Testing process, 2016, pp. 1-53. http://docplayer.net/19466272-Deliverable-d8-1-service-validation-and-testing-process.html (Year: 2016).*

(Continued)

*Primary Examiner* — Mongbao Nguyen
(74) *Attorney, Agent, or Firm* — Teddi E. Maranzano

(57) ABSTRACT

A method is provided for categorizing a problem report in a repository of a problem reporting system as an enhancement request or as a defect. Based on the problem report being the defect and having a high severity level, determining a score indicating a probability that a text portion of the problem report includes problem reproduction steps. In response to the score indicating the probability of problem reproduction steps, flagging the problem report to automate. For each problem report to automate, copying the text portion of the problem report to an automated test script, whereby the test script runs in a continuous pipeline.

11 Claims, 6 Drawing Sheets

(56) References Cited

U.S. PATENT DOCUMENTS

| | | | |
|---|---|---|---|
| 2015/0113331 A1* | 4/2015 | Bhattacharya | G06F 11/3688 |
| | | | 714/38.1 |
| 2016/0359894 A1* | 12/2016 | Andrejko | G06F 40/169 |
| 2018/0267887 A1 | 9/2018 | Dsouza | |
| 2018/0301222 A1* | 10/2018 | Dew, Sr. | G06N 5/022 |
| 2019/0018826 A1* | 1/2019 | Carro | G06F 3/04812 |
| 2019/0089577 A1* | 3/2019 | Misra | G06F 11/3476 |
| 2019/0188119 A1* | 6/2019 | Kumarath | G06F 11/3688 |
| 2019/0196950 A1* | 6/2019 | Ranganathan | G06N 20/00 |
| 2019/0243750 A1* | 8/2019 | Mukherjee | G06F 11/3664 |
| 2020/0019492 A1* | 1/2020 | Fei | G06N 20/00 |
| 2020/0110694 A1* | 4/2020 | Elking | G06F 11/3688 |
| 2020/0241861 A1* | 7/2020 | Zhang | G06F 11/0793 |
| 2020/0379891 A1* | 12/2020 | Canter | G06F 11/3664 |
| 2021/0157975 A1* | 5/2021 | Gelosi | G06F 40/166 |

OTHER PUBLICATIONS

Maximiliano A. Mascheroni, Continuous Testing and Solutions for Testing Problems in Continuous Delivery: A Systematic Literature Review, 2018, pp. 1-30. http://www.scielo.org.mx/pdf/cys/v22n3/1405-5546-cys-22-03-1009.pdf (Year: 2018).*

Disclosed Anonymously, "A Cognitive System and Method for Refining Test Cases Based on the Solution, Design, Communication and Defect Tracking System", An IP.com Prior Art Database Technical Disclosure, IP.com No. IPCOM000254662D, IP.com Electronic Publication Date: Jul. 20, 2018, 4 pages.

Mell et al., "The NIST Definition of Cloud Computing", Recommendations of the National Institute of Standards and Technology, Special Publication 800-145, Sep. 2011, 7 pages.

\* cited by examiner

PRE-POPULATING CONTINUOUS DELIVERY TEST CASES

BACKGROUND

The present invention relates generally to the field of computing, and more particularly to pre-populating continuous delivery test cases.

Customers may discover defects in a software program product during use, and report the defects to technical support, generating a problem report. Integrating the problem report into the test/development team's system may accelerate generating and delivering problem resolutions to customers.

SUMMARY

Embodiments of the present invention disclose a method, computer system, and a computer program product for pre-authorization.

A method is provided for categorizing a problem report in a repository of a problem reporting system as an enhancement request or as a defect. Based on the problem report being the defect and having a high severity level, determining a score indicating a probability that a text portion of the problem report includes problem reproduction steps. In response to the score indicating the probability of problem reproduction steps, flagging the problem report to automate. For each problem report to automate, copying the text portion of the problem report to an automated test script, whereby the test script runs in a continuous pipeline.

A system for pre-populating continuous delivery test cases based on data in a problem report is provided. The system comprises one or more processors, one or more computer-readable memories, one or more computer-readable tangible storage media, and program instructions stored on at least one of the one or more computer-readable tangible storage media for execution. Based on the problem report being the defect and having a high severity level, determining a score indicating a probability that a text portion of the problem report includes problem reproduction steps. In response to the score indicating the probability of problem reproduction steps, flagging the problem report to automate. For each problem report to automate, copying the text portion of the problem report to an automated test script, whereby the test script runs in a continuous pipeline.

A computer program product for pre-populating continuous delivery test cases based on data in a problem report is provided. The computer program product comprises a computer readable storage medium having program instructions embodied therewith. Based on the problem report being the defect and having a high severity level, determining a score indicating a probability that a text portion of the problem report includes problem reproduction steps. In response to the score indicating the probability of problem reproduction steps, flagging the problem report to automate. For each problem report to automate, copying the text portion of the problem report to an automated test script, whereby the test script runs in a continuous pipeline.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
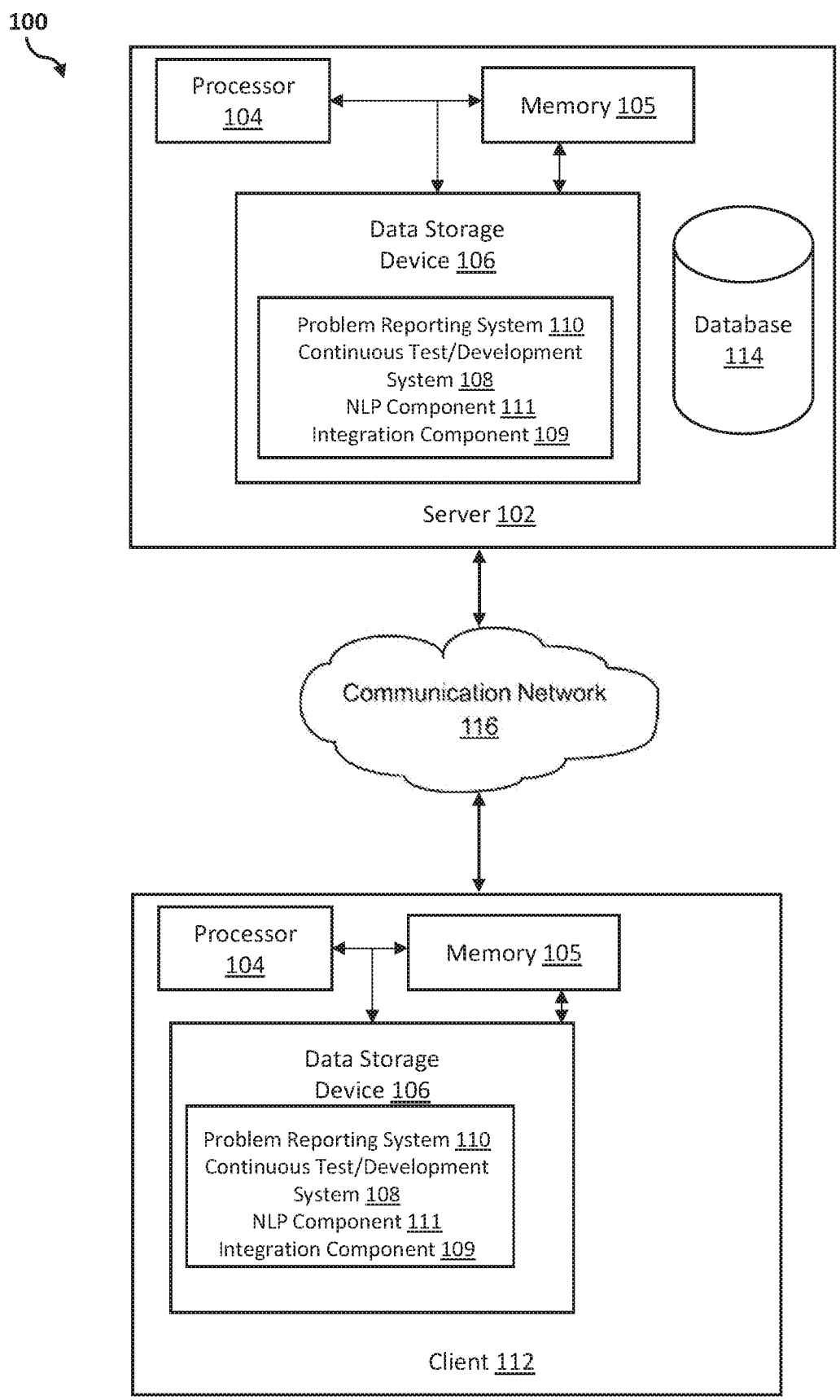
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for pre-populating continuous delivery test cases, based on data in a problem reporting system. Embodiments of the present invention apply to hardware problem determination, as well as to software problem analysis. For simplicity, the focus is on integration between the problem reporting system and the software development and test process. The present embodiment has the capacity to improve computer capabilities by integrating a problem reporting system into the software development and test process. The integration of the systems has the capacity to reduce the amount of time between the customer reporting a problem and a resolution being provided, by removing the intermediate manual steps to analyze and characterize the reported problem, generate an executable test script, and ultimately provide a problem resolution.

When a customer encounters a problem using a software product, the customer typically contacts the vendor's customer support to report the issue. A customer support representative records the steps to reproduce the problem, as described by the customer, in the problem report. Eventually, an engineer analyzes the problem report to determine whether the customer is using the software product in a way that was not intended. Incorrect usage may be a documentation error, if the product documentation incorrectly provided usage guidance, or it may be a product enhancement, which may or may not be included in a future product release. On the other hand, if the engineer determines that the problem report is a product defect, the engineer can use the steps in the problem report to reproduce and resolve the problem. The problem resolution may be provided to the customer as an interim fix, and the fix is packaged into a future product maintenance release.

In current practice, the steps to analyze, characterize, and reproduce the reported problem are performed manually, and may involve several levels of support and development engineers. Therefore, it may be advantageous to, among other things, integrate the test and development system with the problem reporting system to reduce the time between problem reporting and production of the interim fix. A natural language processing (NLP) component may semantically parse and analyze the text of the problem report to extract the sequence of statements that represent the steps to reproduce the reported problem. An executable test script may be generated and integrated into the test and development system as a test case for that product feature. Therefore, the present embodiment tends to break down the silos of support and test communication by providing an intelligent and automatic determination of defect or enhancement. Additionally, manual intervention to re-route problem reports out of the problem reporting system and into the product future enhancement system backlog is avoided. Finally, an integrated system can provide direct feedback to the customer and the customer support representative by linking the test results from the continuous test/development system with the problem reporting system.

According to at least one embodiment, an integration component integrates the continuous test/development system with a natural language processing component, and a problem reporting system (hereinafter, "integrated system"). The problem reporting system receives a customer-submitted problem report as input. A problem report contains information to identify the operating environment, including the problem description and severity, the hardware and software platform and version, and the specific component or software program that is failing. A portion of the problem report includes text that is the sequence of steps that the customer reported to recreate the problem.

A natural language processing (NLP) component of the integrated system may semantically parse and analyze the text of the problem report to extract the sequence of steps to reproduce the reported problem. The NLP can be integrated into the problem reporting system or may be a separate component of the integrated system. NLP techniques can identify and mark sentence, phrase, and paragraph boundaries in the text. Structure extraction can identify fields and blocks of content. NLP can use tokenization to divide the text into tokens for further processing. Performing acronym normalization and tagging can be especially useful in identifying terms in computing, since acronyms are typically used to refer to programming languages, and computer program products and hardware. As general examples, "I/O", and TCP/IP are common acronyms for "Input and Output" and "Transmission Control Program/Internet Protocol", respectively. Various pattern-based extraction techniques can be particularly useful in parsing the problem report because the universe of computing terms is likely to be regular and repetitive.

This initial parsing determines whether the reported problem is a product defect or a product enhancement. Phrases, such as the system "should" respond faster or "could" behave differently may be considered a product enhancement request rather than a product defect. A product enhancement may be re-directed to a repository other than the product defect queue, and may or may not be included in a future product release.

Problem reports that are not product enhancements are initially identified as product defects. Further parsing determines whether the product defect reaches a pre-defined threshold of severity to warrant expedited automated processing. Certain terms and phrases may assist in that determination. For example, terms such as "error", "crash", and "hang" in the problem report description (title) field, along with high severity, such as "1" or "2" may be flagged for automation. However, a problem report with severity of "3" or lower will still be added to a product defect queue for resolution, but will not be flagged for automation. The severity level and threshold are configurable parameters in the integrated system.

The parsing looks for terms that can indicate an action in a sequence of actions, and establishes a relationship between the actions. For example, terms in the sentences that may indicate a sequence of actions, such as "first", "second", "then", and "next" are analyzed to score whether these sentences likely are recreation steps. The NLP Component 111 parses sentences into tokens, these tokens are words and parts of speech. Detecting any words that can indicate steps, such as "first", "second", etc., increases the likelihood that the text represents steps. The tokens can then be checked against a set of keywords that indicate sequencing or steps. In one embodiment, the NLP Component will perform named entity recognition to find software components, button clicks, and parts of the product software features. These will help to determine when it is likely that a sequence or numeric entry is related to a possible set of actions. The ranking of the tokens can be stored in a temporary file, or in memory, that is associated with each problem report record. When the parsing of all the records is complete, the files are programmatically scanned and ranked according to the frequency of occurrences of the keywords and phrases. The NLP Component 111 can include a natural language toolkit, for example Python's NLTK.

The NLP Component 111 then cross references terms identified during the initial parsing with the product literature corpora, looking for similar sentences and terms that describe features, buttons, and functionality associated with the product in the problem report. This phase helps fill in the details for a description that may not have enough details or steps. It can be considered data preparation for later steps when the test automator is ready to start. In an example, the terms and phrases from the record can be programmatically included in a search in the product documentation. If matches are found, the details from the product documentation can either automatically be pulled in and added to the record, or referenced in a temp file associated with the record for review. The corpora can include product documentation as well as the documentation of products that integrate with the original product that is the subject of the problem report. The NLP Component 111 creates n-grams of actions, for example, "click+save+button+summary-page", to use in searching to better find and match against terms to find steps and content to score.

Once the NLP Component 111 completes and the steps to reproduce the problem have been identified, the resulting content, (the steps) can be written a file and stored, for example, within a database via a programming API. The steps can then be imported via a programming API into an automated testing tool.

In one embodiment, an n-gram is created from a line parse or a sentence parse, where an activity or action is found, with a key named entity for an input type, and software component or area. Any combination of the set of key term types that could indicate a step or an action. For example, a set of term type categories may be any combination of the following "action+input-type+component+data-input+post-action+observation"

For example, the NLP Component 111 of the integrated system may perform a sentence similarity check against the product documentation which likely has steps in sequences that are relevant and map them if they are statistically close to the reported set of steps.

In one embodiment, this can be achieved through a basic text search and comparison between the content in the problem report record, and the content in the product documentation. The results can be stored in temporary files that can either be manually reviewed one at a time for inclusion or processed in bulk, for example, through a user interface for review.

The similarity between the text of the report and the product documentation, and the type of progressive terms used, denotes a sentence as a step to be included to generate the script to recreate the defect. In one embodiment, the text used in the problem report is compared against product documentation or other test scripts that can have steps. When the text similarity results are over a designated threshold, say 0.85 to each other, it will be designated as a step or possible step.

According to at least one embodiment, the integrated system periodically polls the defect queue for product defects that have an "automate" flag set. The NLP component of the system parses the text from the description section of the product defect, and copies the content into a new test script. The copied text is parsed and transformed to conform to the semantics of the programming language that is compatible with the test system. This can be achieved through integrating the testing tool, as through an API, and the defect software. In one embodiment, a programming language script can run in a loop to perform a basic copy and paste between the defect tracking record and the test script in a functional tester. By pasting the text in to the "main body" of the test script, knowledge of the semantics of the programing language of the test script is not needed. The purpose of this step is to jump start work on the test and get the basic description in to the script. Some of the motivation is that for logged defects, there should be an automated script to test for that use case in the future so that the automated test finds the issue before a customer does. Additionally, having the steps automatically copied into the testing tool after a pre-processing phase is more efficient and saves the test engineer time. For example, the test engineer could have several test scripts ready to execute that were automatically created with the basic steps.

The new test script serves as a basis for developing the automation, thereby saving time and focusing on accuracy of steps extracted from the original problem report. Once in place, the steps are converted to automated code by virtue of tapping into a framework of common methods and steps that are already developed and are in place. In an automated test framework, common actions are created as libraries or functions to be called upon during script creation. For example, "open project" →"create a document" →"Save document" →"close project." Each of these common steps may already have been created as global, re-usable functions. This various upon automation framework and the level of maturity of the automation test harness.

The automated test script can be part of the test framework that is executed in a continuous development and test pipeline. Once the automated script is running, results can optionally be written back to the original problem report as frequently as it runs, informing the customer and support engineer of the results and any defects that may have been found. Optionally, after polling the defect queue, an additional step can allow selection of tests from the test repository to be included in the pipeline. This allows prioritizing the execution of certain tests, for example, to exercise new features in an upcoming product release. Additionally, tests can be organized in the database by product, release, and hardware platform, among other identifying characteristics. A product manager, or test lead engineer can periodically review the tests in the test repository, for example, by product, version, and hardware platform, among other identifying characteristics. This promotes maintenance of the test repository to determine test obsolescence, or whether the test needs modification because it is defective, or does not test new features.

Referring to FIG. 1, an exemplary networked computer environment 100 in accordance with one embodiment is depicted. The networked computer environment 100 may include a server 102 with a processor 104, a memory 105, and a data storage device 106. The data storage device 106 stores the program instructions of various software programs, including an operating system (914 of FIG. 4), a problem reporting system 110, a continuous test/development system (test system) 108, an integration component 109, and an NLP component 111. The integration component 109 provides an interface for a user to retrieve and view the contents of both the test system 108 and the problem reporting system 110. The user can manually determine whether the problem report is mischaracterized, and should be moved to or from an enhancement request queue or a product defect queue, or to review that the assigned severity is accurate for the problem description.

The various software programs are loaded into memory 105 for the processor 104 to execute. The networked computer environment 100 may also include a client 112 that is similarly configured to the server 102. The client 112 may be a workstation that accesses the server 102 remotely, and that includes a computer display monitor 924, a keyboard 926, and a computer mouse 928. A database 114 is shown in the server 102, but may be included in either the client 112, the server 102, or both. The database 114 includes the customer problem reports, one or more product defect queues, one or more product enhancement queues, the corpora of documentation for the various products being tested and supported, the natural language processing rules, and a repository of the program test scripts. Although one database 114 is shown, each can be stored in one or more separate databases 114. The program test scripts can be organized and stored by various criteria, including product, version, hardware platform, and operating system. The networked computer environment 100 may include a plurality of servers 102 and clients 112, only one of which type is shown. A communication network 116 provides connectivity among the plurality of servers 102 and clients 112. The communication network 116 may include various types of communication networks, such as a wide area network (WAN), local area network (LAN), a telecommunication network, a wireless network, a public switched network and/or a satellite network. FIG. 1 provides only an illustration of one implementation and does not imply any limitations regarding the environments in which different embodiments may be implemented. Many modifications to the depicted environments may be made based on design and implementation requirements.

The server 102 may communicate with the client 112 via the communications network 116. The communications network 116 may include connections, such as wire, wireless communication links, or fiber optic cables. As will be discussed with reference to FIG. 4, client 112 may include internal components 902a and external components 904a, respectively, and the server 102 may include internal components 902b and external components 904b, respectively. Client 112 may also operate in a cloud computing service model, such as Software as a Service (SaaS), Analytics as a Service (AaaS), Platform as a Service (PaaS), or Infrastructure as a Service (IaaS). The server 102 may also be located in a cloud computing deployment model, such as a private cloud, community cloud, public cloud, or hybrid cloud. The client 112 may be, for example, a mobile device, a telephone, a personal digital assistant, a netbook, a laptop computer, a tablet computer, a desktop computer, or any type of computing devices capable of running a program, accessing a network, and accessing a database 114.

Figure 2:
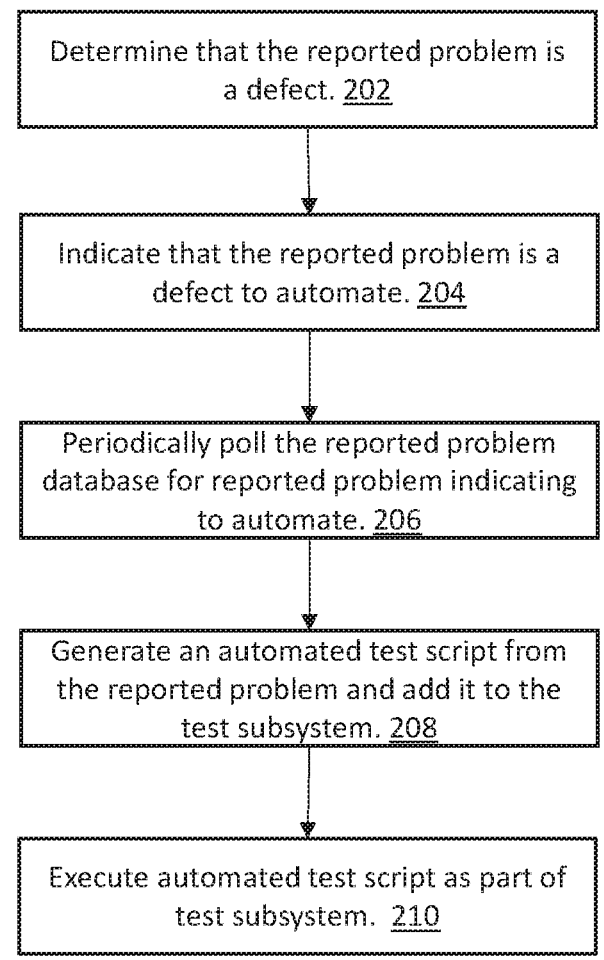
FIG. 2 is a flowchart illustrating a process for identifying product defects in at least one embodiment.

Referring now to FIG. 2, a flowchart illustrating a process for identifying a product defect is depicted.

At 202, the integrated system determines that the reported problem is a defect. When reporting a problem to a vendor's customer support engineer, the customer includes information about the operating environment of the product, a problem description and the severity of the problem which indicates the level of impact to the customer's business. The customer can also directly enter a problem report through email or through a web-enabled interface that the vendor provides.

The NLP component 111 of the integrated system scans the text of the problem report using NLP techniques. Whether the problem report was created by email, through the web-enabled interface, or by calling the vendor's customer support, or some other means, the NLP component 111 may parse the input and create a problem report in a uniformly formatted form.

This initial parsing determines whether the reported problem is a product defect or a product enhancement, depending on identifying certain phrases and terms in the text. Phrases, such as the system "should", or "could" may be considered a product enhancement request rather than a defect. Terms and phrase such as "error", "crash", and "hang" may identify the problem report as a defect.

At 204, the NLP component 111 of the integrated system indicates that the reported problem is a defect to automate. In 202, the problem report was identified as a defect. Here, the problem report is further analyzed to identify the problem severity. A high severity, such as "1" or "2", may be flagged for automation and then added to the product defect queue, because a high severity indicates a high negative impact on the customer's ability to use the product. A lower severity problem is still added to the product defect queue, but is not flagged for automation. The product vendor customizes the problem reporting system 108 by identifying the types of failures for the product and then assigning each one a severity.

At 206, the integrated system periodically polls the product defect queue in the database 114 for defects that are flagged for automation. The polling interval is customizable. When a product defect is identified, for example, by the "automate" flag, it as selected for automation. The integrated system may move the product defect to another defect queue, set a different flag, or take a similar action to prevent the polling from selecting the same product defect more than once. The NLP component 111 of the integrated system parses the description section of the product defect, and copies the content into a new test script.

At 208, the NLP component 111 generates an automated test script from the reported problem. The NLP component 111 of the integrated system parses the description section of the product defect, and formats the content into a new test script. The copied text is parsed and transformed to conform to the semantics of the programming language that is compatible with the test system 108. The generated test script is added to the database 114, where the test system 108 can retrieve it.

At 210, the test system 108 executes the generated test script as part of the pipeline. Once the automated script is running, results can optionally be written back to the original problem report as frequently as it runs, informing the customer and support engineer of the results and any defects that may have been found.

Figure 3:
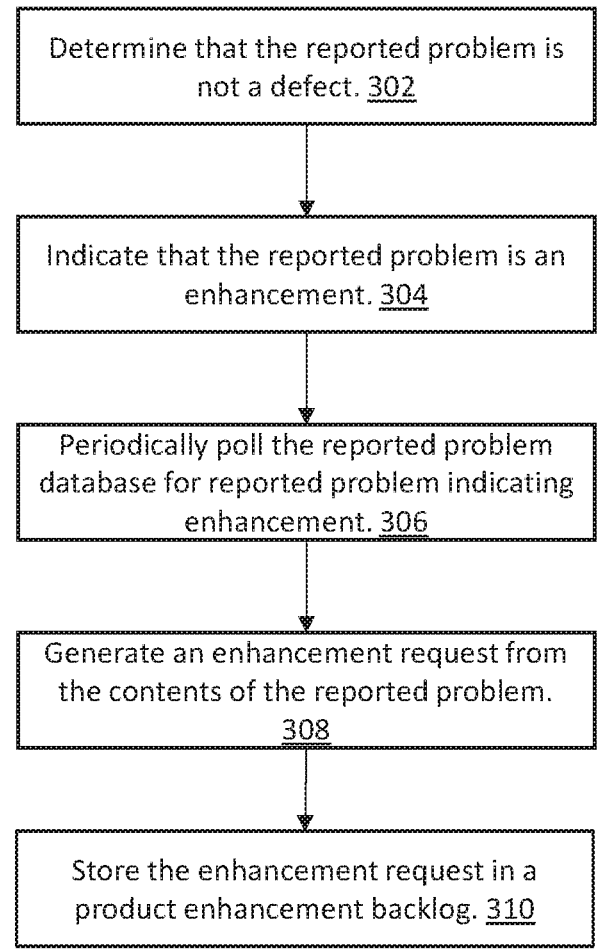
FIG. 3 is a flowchart illustrating a process for identifying program enhancements in at least one embodiment.

FIG. 3 is a flowchart illustrating a process for identifying program enhancements in at least one embodiment.

At 302, the integrated system determines that a reported problem is not a defect. As described with reference to FIG. 2, the initial parsing distinguishes a product defect from a product enhancement. Phrases, such as the system "should" respond faster or "could" behave differently may identify the problem report as a product enhancement request rather than as a defect. A correction, addition, or clarification to product documentation may be another type of problem report that is not a product defect. Similarly, a problem report that asks a question to clarify how to use the product, is not identified as a product defect. The system may lower the severity of "how to" and documentation type problem reports to the lowest severity level, and remove them to a separate queue in the database 114.

At 304, the system may indicate that the problem report is product enhancement with an "Enhance" flag in the problem record. The problem report may remain on the queue in the database 114, or be moved to a product enhancement backlog. A correction, addition, or clarification to product documentation may be another type of problem report that is not a product defect. Similarly, a problem report that asks a question to clarify how to use the product, is not identified as a product defect. The system may lower the severity of "how to" and documentation type problem reports to the lowest severity level, and leave them on the defect queue, or remove them to a separate queue in the database 114.

At 306, the system periodically polls the appropriate queue in the database 114 for a problem report flagged as a product enhancement. The polling interval is customizable.

At 308, the system generates an enhancement request from the contents of the reported problem. In processing similar to that in 208 of FIG. 2, the NLP component 111 generates a product enhancement request from the problem report. The NLP component 111 of the integrated system parses the description section of the product defect, and formats the content into a new product enhancement request.

Figure 4:
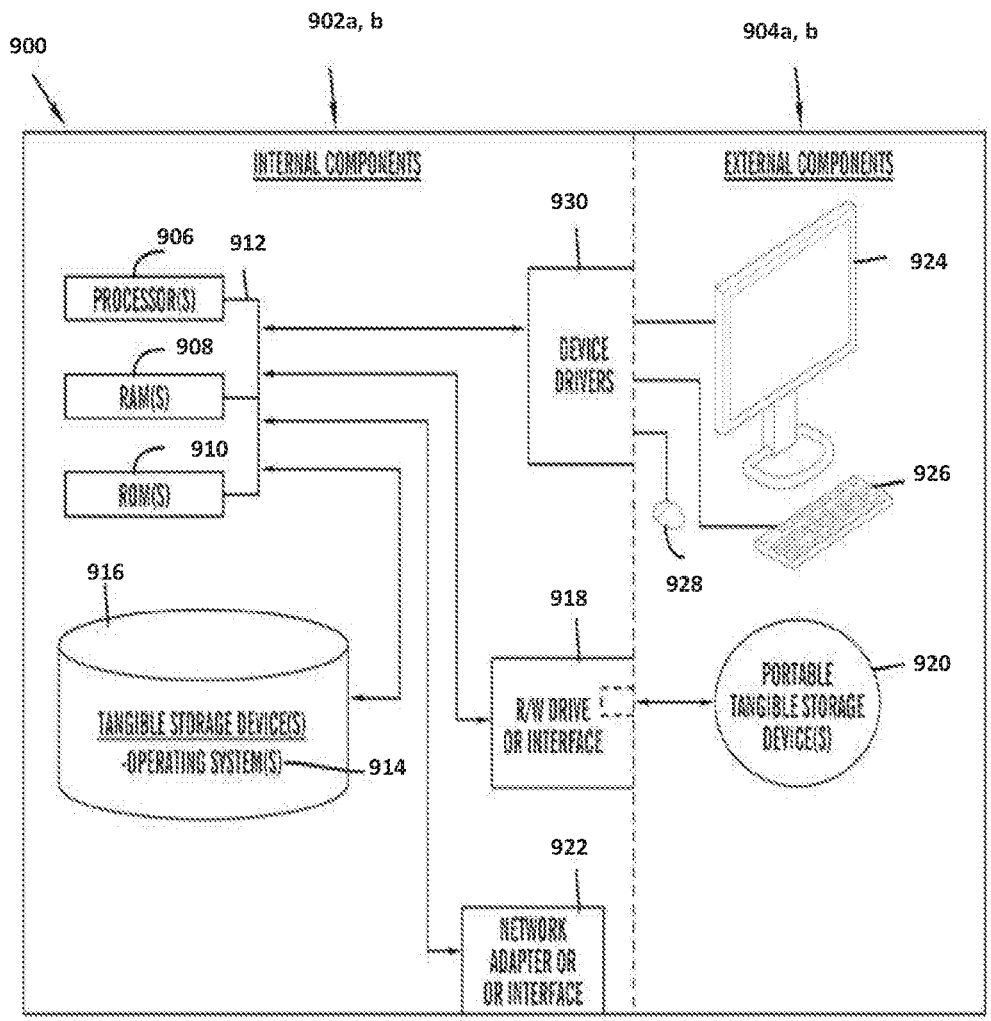
FIG. 4 is a block diagram of internal and external components of computers and servers depicted in FIG. 1 according to at least one embodiment.

At 310, the generated product enhancement request is added to a product enhancement backlog queue in the database 114 for future review and prioritization by product management FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations about the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Server 102 and client 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, problem reporting system 110, test system 108, integration component 109, and a NLP component 111 may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. The various software programs of FIG. 1, can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3 G or 4 G wireless interface cards or other wired or wireless communication links. The various software programs of FIG. 1 can be downloaded from an external computer (e.g., server) via a network (for example, the Internet, a local area network or other, wide area network) and respective network adapters or interfaces 922. From the network adapters (or switch port adaptors) or interfaces 922, the various software programs of FIG. 1 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
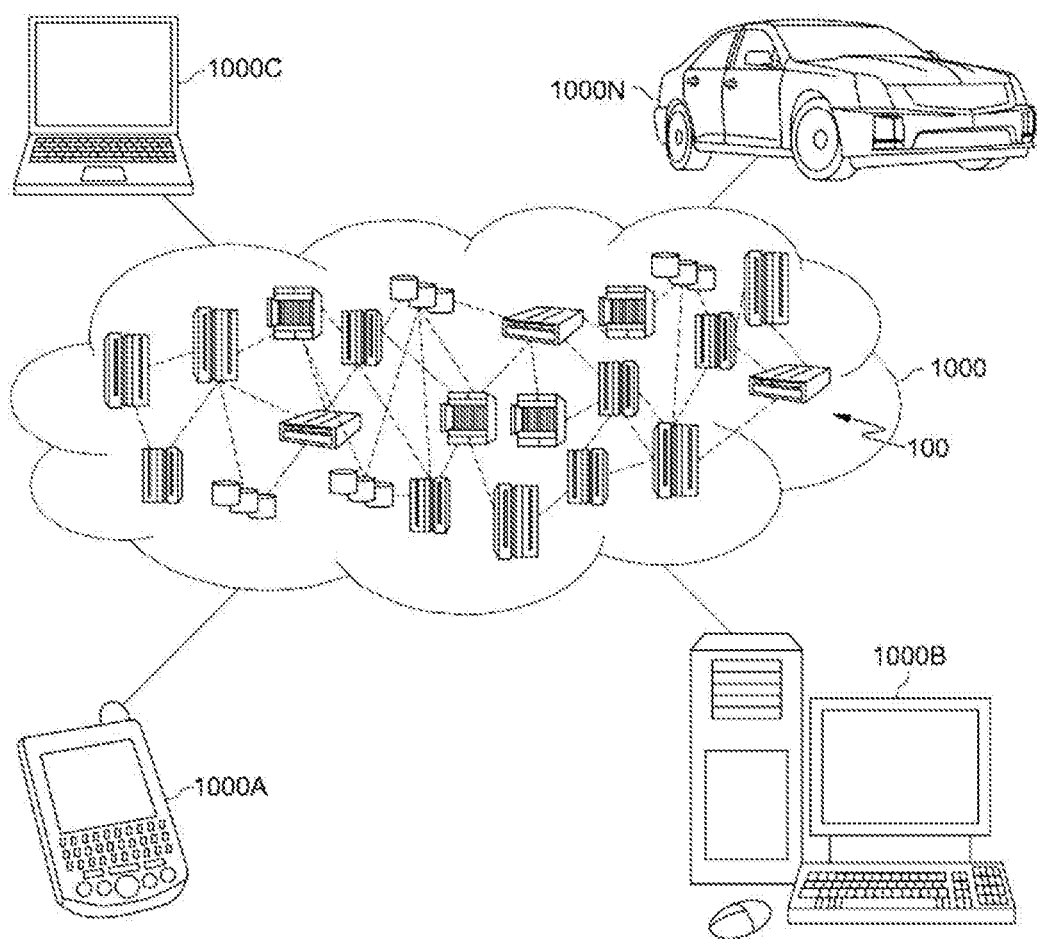
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
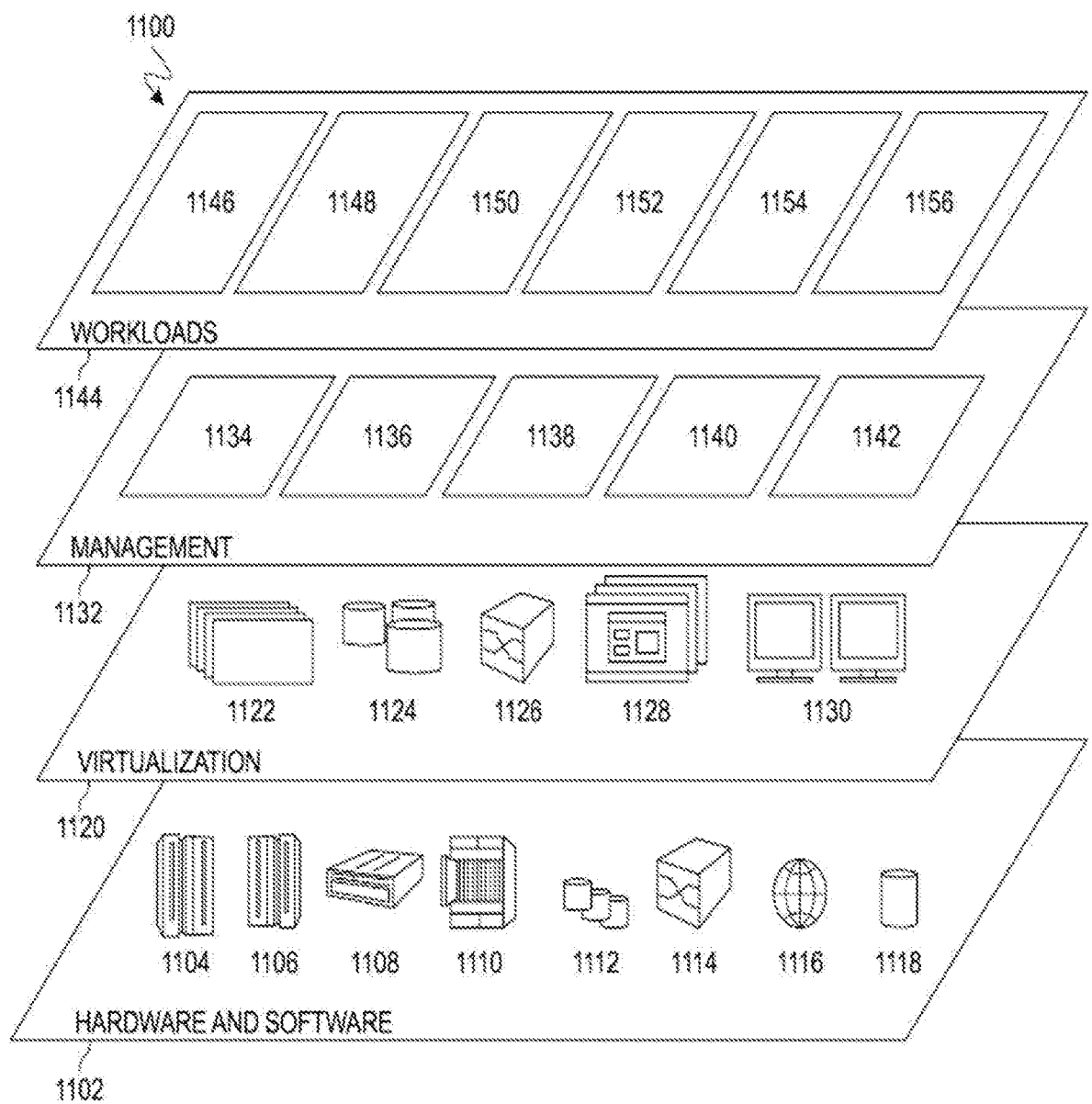
FIG. 6 is a block diagram of functional layers of the illustrative cloud computing environment of FIG. 4, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and pre-authorization 1156. A pre-authorization program 110a, 110b provides a way to reduce patient wait times by using NLP and ML combined with key features of successful treatments to identify key stakeholders for authorization.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    categorizing a problem report from a problem reporting system as an enhancement request or as a defect, based on natural language processing of the problem report;
    based on the problem report being the defect and having a high severity level, determining a score indicating a probability that a text portion of the problem report includes problem reproduction steps;

in response to the score indicating the probability of problem reproduction steps and the high severity level, flagging the problem report to automate;

for each problem report to automate, copying the text portion of the problem report to an automated test script, wherein the automated test script runs in a continuous pipeline;

periodically polling a repository of the problem reporting system for the problem report categorized as the enhancement request;

copying the text portion of the problem report to a new enhancement request; and storing the new enhancement request in a backlog, wherein the backlog is periodically evaluated for development prioritization;

wherein the automated test script is formatted according to a syntax of a programming language of the continuous pipeline, and wherein results of a test script execution are iteratively reported back to the problem report in the problem reporting system.

2. The method of claim 1, wherein the high severity level is configurable.

3. The method of claim 1, wherein the score is determined by natural language processing techniques.

4. A computer system, the computer system comprising one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

categorizing a problem report from a problem reporting system as an enhancement request or as a defect, based on natural language processing of the problem report;

based on the problem report being the defect and having a high severity level, determining a score indicating a probability that a text portion of the problem report includes problem reproduction steps;

in response to the score indicating the probability of problem reproduction steps and the high severity level, flagging the problem report to automate;

for each problem report to automate, copying the text portion of the problem report to an automated test script, wherein the automated test script runs in a continuous pipeline;

periodically polling a repository of the problem reporting system for the problem report categorized as the enhancement request;

copying the text portion of the problem report to a new enhancement request; and storing the new enhancement request in a backlog, wherein the backlog is periodically evaluated for development prioritization;

wherein the automated test script is formatted according to a syntax of a programming language of the continuous pipeline; and wherein results of a test script execution are iteratively reported back to the problem report in the problem reporting system.

5. The system of claim 4, wherein the high severity level is configurable.

6. The system of claim 4, wherein the score is determined by natural language processing techniques.

7. The system of claim 4, wherein test scripts are manually reviewed and selected through a component that integrates the problem reporting system with the continuous pipeline.

8. A computer program product, wherein the computer program product comprises a computer readable storage medium having program instructions embodied therewith, the program instructions executable by a processor to cause the processor to perform a method comprising:

categorizing a problem report from a problem reporting system as an enhancement request or as a defect, based on natural language processing of the problem report;

based on the problem report being the defect and having a high severity level, determining a score indicating a probability that a text portion of the problem report includes problem reproduction steps;

in response to the score indicating the probability of problem reproduction steps and the high severity level, flagging the problem report to automate;

for each problem report to automate, copying the text portion of the problem report to an automated test script, wherein the automated test script runs in a continuous pipeline;

periodically polling a repository of the problem reporting system for the problem report categorized as the enhancement request;

copying the text portion of the problem report to a new enhancement request; and storing the new enhancement request in a backlog, wherein the backlog is periodically evaluated for development prioritization;

wherein the automated test script is formatted according to a syntax of a programming language of the continuous pipeline, and wherein results of a test script execution are iteratively reported back to the problem report in the problem reporting system.

9. The computer program product of claim 8, wherein the high severity level is configurable.

10. The computer program product of claim 8, wherein the score is determined by natural language processing techniques.

11. The computer program product of claim 8, wherein test scripts are manually reviewed and selected through a component that integrates the problem reporting system with the continuous pipeline.

* * * * *